United States Patent [19]

Viner

[11] 3,746,134

[45] July 17, 1973

[54] FLUID-PRESSURE ACTUATORS

[75] Inventor: George Charles Viner, London, England

[73] Assignee: Westinghouse Brake and Signal Company, Limited, London, England

[22] Filed: Nov. 19, 1971

[21] Appl. No.: 200,377

[30] Foreign Application Priority Data
Dec. 9, 1970   Great Britain............... 58,438/70

[52] U.S. Cl............................. 188/203, 188/196 D
[51] Int. Cl........................................... F16d 65/66
[58] Field of Search.................. 188/196 A, 196 D, 188/196 BA, 202, 203

[56] References Cited

UNITED STATES PATENTS

| 3,100,032 | 8/1963 | Larsson.......................... 188/196 D |
| 3,401,775 | 9/1968 | Sobol et al...................... 188/196 D |
| 3,482,662 | 12/1969 | Bruhn et al.................. 188/203 S X |

Primary Examiner—Duane A. Reger
Attorney—Roberts B. Larson et al.

[57] ABSTRACT

A fluid-pressure actuator (more particularly, a brake cylinder) combined with a slack adjuster operative to telescope the output-rod parts of the actuator; the slack adjuster being rendered operative only when the "release" fluid pressure to the actuator is present and the "application" fluid pressure is absent.

24 Claims, 1 Drawing Figure

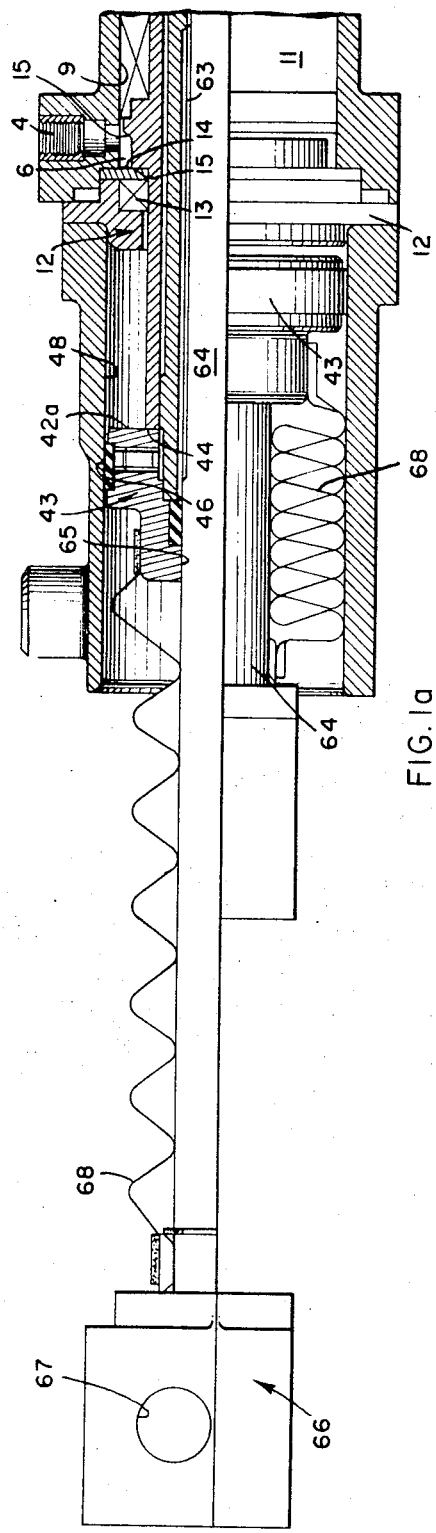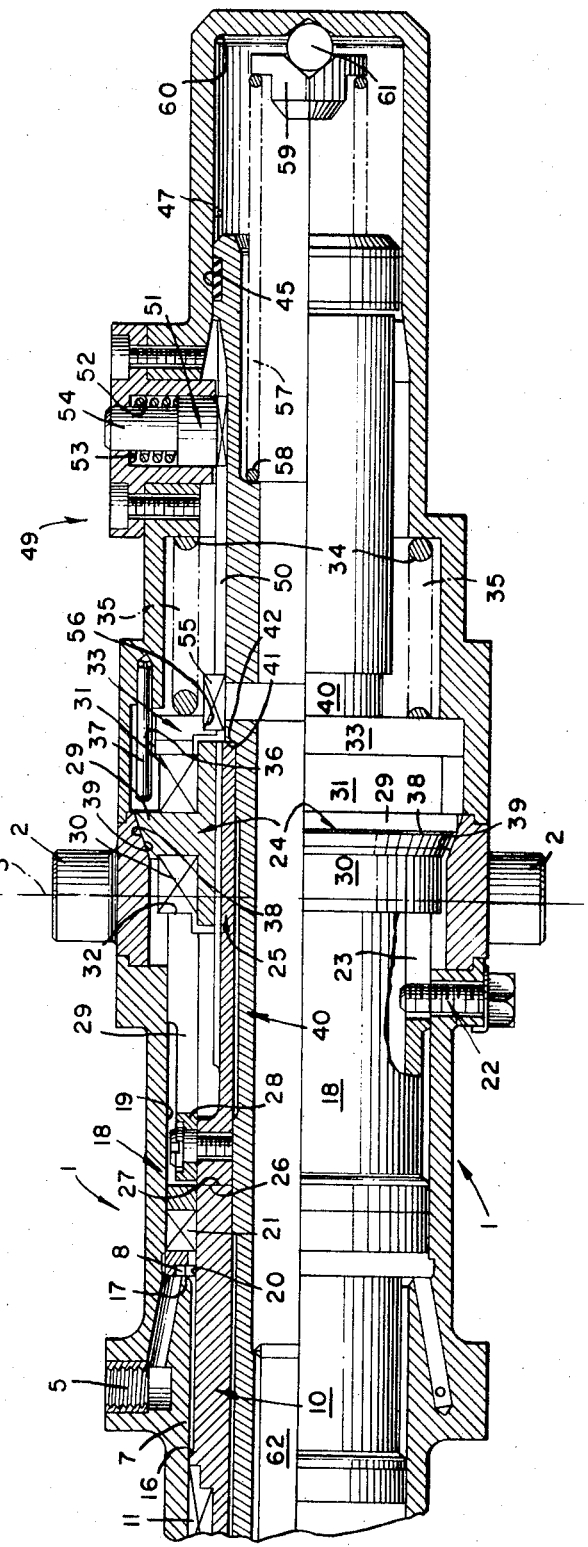

FLUID-PRESSURE ACTUATORS

This invention relates to fluid-pressure actuators.

The present invention provides a fluid-pressure actuator having a hollow body within which is a pressure-responsive member to which is operatively connected an output member movable in opposite directions, one side of the pressure-responsive member forming one wall of a first chamber having communicating therewith a first port through which a first fluid pressure can be applied to the chamber to act on said one side of the pressure-responsive member to move that member in one direction and thereby correspondingly to move the output member in one of the opposite directions of movement and the other side of the pressure-responsive member forming one wall of a second chamber having communicating therewith a second port through which a second fluid pressure can be applied to the second chamber to act on said other side of the pressure-responsive member to move that member in the opposite direction and thereby correspondingly to move the output member in the other of its opposite directions of movement; and adjustment means operative upon the stroke of the output member exceeding a predetermined amount to telescope the output member relative to the pressure-responsive member, the adjustment means including inhibiting means by which the adjustment means is rendered inoperative so as to telescope the two members for so long as the second fluid pressure is present whilst the first fluid pressure is absent.

The inhibiting means may include a pair of parts engagable one with the other, one of which parts is non-rotatably mounted in the body and engagement of the parts inhibiting the adjustment means from being operative to effect relative telescoping of the two members. One of the parts may have therein a series of slots engagable in any one of which is the second part in the form of a projection.

The adjustment means may include an element threadedly engaged with the output member, relative rotation of the element and the output member effecting the relative telescoping of the output member and the pressure-responsive member. The output member may be non-rotatably located relative to the body, the element then being both axially and rotatably movable in the body. The element may be tubular and have an internal thread with which the output member is threadedly engaged and, in this case, the element may have a shoulder through which movement of the pressure-responsive member in its said one direction is transmitted to the element thereby to move it axially axially to move the output member in said one of its opposite directions of movement. The element may have another shoulder through which movement of the pressure-responsive member in its said opposite direction is transmitted to the element thereby to move it axially axially to move the output member in said other of its opposite directions so long as the locking means is rendered inoperative. Conveniently, the element may pass through the pressure-responsive member, the shoulders then being positioned one on each side of the pressure-responsive member. With such an arrangement, the element may be guided for axial, rotational movement in the body by bearing surfaces one adjacent each end of the element, which surfaces bear against corresponding bores in the body. When the output member is non-rotatably located relative to the body and the element is both axially and rotatably moveable in the body, the element may be formed with external helical teeth engaged by a ratchet mounted in the body, which ratchet moves from engagement with one tooth into engagement with the next succeeding tooth if the stroke of the output member exceeds said predetermined amount. When the element is guided by bearing surfaces as above described and is also formed with external helical teeth also as above described, the helical teeth and the ratchet may be situated intermediate the pressure-responsive member and the bearing surface most remote from the pressure-responsive member.

The actuator may further have locking means resiliently urged into an operative condition in which the locking means is effective to lock the output member against movement in said other of its opposite directions, which locking means is rendered inoperative by the presence of the second fluid pressure. The locking means may be located between the pressure-responsive member and the adjustment means. In this case, the body may be substantially tubular and the pressure-responsive means, the locking means and the adjustment means may then be located serially one after the other along the length of the body. The locking means may comprise a pair of clutch faces and, in this case, the clutch faces may be formed one on the body and the other on a nut rotatable in the body. The nut may be threadedly-engaged with a member operatively connected with the output member. When the element has a shoulder through which movement of the pressure-responsive member in its said one direction is transmitted as abovedescribed, the member threadedly engaged by the nut may be clamped between the pressure-responsive member and the shoulder on the element. In this case and when the clutch faces are formed one on the body and the other on a nut rotatable in the body, the nut may be located between a pair of thrust bearings one of which is positioned between the nut and a bearer between which and a shoulder on the body extends a compression spring by which the locking means is resiliently urged into its operative condition. The bearer may be non-rotatably mounted but axially slidable with respect to the body and may have a series of radially-extending slots engagable in which is a projection carried by the element such that when so engaged the element is rendered non-rotatable with respect to the body. The element may be resiliently urged into a position in which the projection is so engaged and may be so resiliently urged by a spring extending between the element and an interior end face of the body. When the nut is located between a pair of thrust bearings as above described, the other of the thrust bearings may be positioned between the nut and a second pressure-responsive member non-rotatably mounted in the body and forming one wall of a third chamber in communication with which is the second port, the member threadedly engaged by the nut being non-rotatably mounted but axially slidable with respect to the second pressure-responsive member.

The body may have external trunnions by means of which the actuator can be pivotally mounted.

The pressure-responsive members may both be annular pistons, the second pressure-responsive member being slidable on the first pressure-responsive member.

One embodiment of the present invention will now be described in greater detail, by way of example only, with reference to the accompanying Drawing which shows a part cross-sectional view of the actuator.

Referring to the Drawing, the actuator comprises a sectionalised substantially tubular body 1 provided with a pair of trunnions 2 by means of which the actuator can be mounted for pivotal movement about the axis 3. The body 1 has two parts 4 and 5 and provides a first chamber 6 in communication with which is the first port 4. The tubular body further provides a second chamber 7 communicating with which is a third chamber 8; the port 5 directly communicating with the third chamber 8 and indirectly chamber 7.

The peripheral outer wall of the first and second chambers 6 and 7 are provided by a common bore 9 in the body 1 within which bore 9 is slidable a first pressure-responsive member in the form of an annular piston 10. The piston 10 carries an annular seal 11 by means of which the piston 10 is sealingly slidable in the bore 9 and which serves to seal the first chamber 6 from the second chamber 7. The piston 10 extneds through a wall 12 (forming part of the body) being sealed where it passes through the wall 12 by a seal 13.

One end wall of the first chamber 6 is provided by an end face 14 of the wall 12 and the opposite end face of the first chamber 6 is provided by an end face 15 on one side of the annular piston 10. Thus, the application of fluid pressure to the chamber 6 through the port 4 will act on the end face 15 of the piston 10 to urge that piston to the right as viewed in the drawing.

Similarly, an end face 16 on the opposite side of the piston 10 forms one end face of the chamber 7 so that the application of fluid-pressure to the chamber 7 through the port 5 will urge the piston 10 to the left as viewed in the drawing. As can be seen from the drawing, the end face 15 of the piston 10 is of larger effective area than the end face 16 thereof.

Forming an end face of the chamber 8 is one end 17 of a second pressure-responsive member in the form of a piston 18 slideable within a bore 19 in the body 1 and on the peripheral external face of the piston 10 being sealingly engaged with both the bore 19 and the face 20 by a seal 21. Whilst the piston 18 is slideable with respect to the body 1 it is prevented from being rotatable with respect thereto by a spiggot 22 screwed into the body 1 and projecting into an axial slot 23 in the piston 18. It will be seen, therefore, that the application of fluid pressure to the chamber 8 through the port 5 will urge the piston 18 to the right as viewed in the drawing.

To the right (as viewed in the drawing) of the piston 18 is a nut 24 threadedly engaged with a tubular element 25 the left-hand (as viewed in the drawing) and face 26 of which abuts the right-hand end (as viewed in the drawing) face 27 of the piston 10. The tubular element 25 carried a projection 28 which extends into a second axial slot 29 in the piston 18 so that whilst the element 25 is slidable axially of the body 1 with respect to the piston 18, it is prevented from rotating with respect thereto. The nut 24 carries a radially-extending flange 29 on each side of which is located respectively thrust bearings 30 and 31. The thrust bearing 30 is positioned on the left-hand side (as viewed in the drawing) of the flange 29 between that flange and the right-hand end (as viewed in the drawing) of the piston 18. The other thrust bearing 31 is positioned between the right-hand (as viewed in the drawing) side of the flange 29 of the nut 24 and a part or bearer 33 between which and a shoulder 34 in the body 1 extends a compression spring 35. The bearer 33 is formed with a slot 36 through which projects a pin 37 fixed to the housing 1 and serving to prevent rotation of the bearer 33 relative to the body 1 whilst allowing the bearer 33 to move axially thereof.

The nut 24 is provided with a first clutch face 38 engagable with a second clutch face 39 and urged into such engagement by the spring 35 being effective on the nut 24 through the bearer 33 and the thrust bearing 31.

Extending completely through the part so far described is a tubular element 40 providing a first shoulder 41 engaged by the right-hand end (as viewed in the drawing) face 42 of the element 25. The element 40 further provides at its left-hand end (as viewed in the drawing) a second shoulder 42a provided by the end face of a flange 43 secured to the element 40. This shoulder 42 is engaged by the right-hand end (as viewed in the drawing) face 44 of the piston 10 so that it can be seen that the piston 10 and the element 25 are firmly clamped to the tubular element 40 between the two shoulders 41 and 42.

The tubular element 40 is rotatably and axially moveable within the body 1 being guided therein by bearing surfaces 45 and 46 one at each end of the element 40 and engaged with bore 47 and 48 respectively in the body 1.

Between the nut 24 and the bearing surface 45 on the tubular element 40 is adjustment means 49 constituted by a plurality of helical threads 50 (of which one only is shown in the drawing) engaged by a ratchet 51 slidable in a bore 52 in the body 1 and resiliently urged into engagement with the helical threads 50 by a compression spring 53 encircling the stem 54 of the ratchet 50 and located within the bore 52 in the body 1.

The tubular element 40 carries a projection or part 55 located at the left-hand end (as viewed in the drawing) of the helical threads 50 and engageable with any one of a series of slots 56 in the bearer 33. The tubular element 40 is resiliently urged into its position in which the projection 55 is engaged in one of the slots 56 in the bearer 33, by a compression spring 57 extending between a shoulder 58 on the interior surface of the tubular element 40 and a spring abutment 59 between which and the end wall 60 of the body 1 is a ball 61. Moreover, so long as the second fluid pressure is present in chambers 7 and 8 whilst the first fluid pressure is absent in chamber 48, the piston 10 will be urged to the left (as viewed in the drawing) and the piston 18 to the right thus further ensuring positive engagement of the projection 55 in one of the slots 56. Because of this arrangement, the inter-engagement of the projection 55 in the relevant one of the slots 56 is engaged by such a force that they cannot be disengaged (thus possibly affecting operation of the adjustment means 49) by a blow on the output member 64 directed to the right unless such a blow is of a force unlikely to be experienced in normal operation of the actuator.

The tubular element 40 is provided with an internally-threaded portion 62 threadedly engaged by an external thread 63 on a rod-like output member 64. The flange 43 secured to the tubular member 40 has therein a bore 63 which acts to guide the output member 64 wiht respect to the tubular element 40 in relative movement of those parts. At its end external of the actuator, the output member 64 is provided with a cross-head 66 having therethrough a bore 67 through which may be passed a pin (not shown) by which the output member can be connected to that which is to be operated by the actuator; for example, the brakes of a railway vehicle.

Extending between the cross-head 66 and the flange 45 of the tubular element 40 is a conventional rubber boot 68 which serves to protect the internal parts of the actuator from the ingress of dirt.

In the drawing, the upper part of the drawing shows the various parts in the positions they would have when no fluid pressure is applied either to the port 4 or the port 5 and with no adjustment having been made by the adjustment means 49. In this condition of the actuator, the output member 64 is fully-extended with respect to the body 1 being so extended partly by virtue of the normally-provided release spring provided in the brakes (not shown) to be operated by the actuator and partly by the spring 57 which urges the tubular element 40 to its left-hand (as viewed in the drawing) extremity. In this condition, the end face 15 of the piston 10 engages the face 14 of the wall 12 of the body 1; the projection 55 is engaged with one of the slots 56 in the bearer 33; and the clutch faces 38 and 39 on the nut 24 and the body 1 respectively are engaged by the spring 35.

From this condition of the actuator, it operates as follows:

In the normal "operative condition" of the actuator, fluid pressure would be applied to the port 5. Such application of fluid pressure would be effective in the second chamber 7 and the third chamber 8. The presence of fluid pressure in the chamber 7 would act on the face 16 of the piston 10 further to ensure retention of the tubular element 40 (and, therefore, the output member 64) in its extended position due to abutment of the end face 44 of the piston 10 with the shoulder 42 of the tubular element 40. The piston 10 would be restrained from further movement to the left (as viewed in the drawing) by engagement of its face 15 with the face 14 of the wall 12 of the body 1. The application of fluid-pressure to the chamber 8 would mean that this fluid pressure is effective on the end face 17 of piston 18 thus urging that piston 18 to the right (as viewed in the drawing). The force thus impressed on the piston 18 is sufficient to overcome the force exerted by the spring 35 retaining the clutch faces 38 and 39 engaged thus spinning the nut 24 to the right (as viewed in the drawing) on the thread of the element 25. The nut 24 would be so moved by virtue of engagement of the end face 32 of the piston 18 with the thrust bearing 30, the nut being free to spin by virtue of it being supported between the thrust bearings 30 and 31. The nut would thus move axially until the bearer 33 engaged a shoulder 69 in the body 1. In this condition, the nut is still free to spin being de-clutched from the body 1 and now being solely rotatably supported by the thrust bearings 30 and 31.

Upon the application of fluid-pressure to the port 4, this will be applied to the first chamber 6 to act on the end face 15 of the piston 10. This application of fluid-pressure to the face 15 of the piston 10 will move the piston 10 to the right (as viewed in the drawing) carrying with it the element 25 with which the piston 10 abuts at the inter-engaged faces 26 and 27. Similarly, the element 40 will be moved to the right (as viewed in the drawing) by virtue of the interengaged faces 41 and 42 to carry the tubular element 40 to the right with the piston 10. The output member 64 being threadedly engaged with the tubular member 40 and being prevented from rotation by the pin (not shown) passing through the bore 67 in the cross-head 66, the output member 64 will be drawn to the right (as viewed in the drawing) with the tubular member 40 to, in the event of the actuator being used from the actuation of the brakes of a rail vehicle, apply those brakes.

Release of the fluid pressure in the chamber 6 through the port 4 will permit the piston 10, the element 25, the tubular element 40, and the output member 64 to be returned to the left (as viewed in the drawing) by the normally provided return spring in the brakes of the vehicle. However, such return of these parts will be assisted by the fluid pressure still present in the second chamber 7 which is effective on the face 16 of the piston 10. During this return movement, the nut 24 will freely spin in its opposite direction still being supported on the thrust bearings 30 and 31 with the clutch faces 38 and 39 being maintained disengaged by the presence of fluid pressure in the chamber 8 as above described. Thus, it can be seen that repetitive brake applications and releases can be made by repetitive application to and release from of fluid-pressure in the chamber 6 through the port 4.

Should it now be required to "park" the vehicle by maintaining the brakes applied without the necessity of retaining the application of fluid pressure to the chamber 6, this can be effected as follows:

The fluid pressure in the chambers 7 and 8 can be released through the port 5 so that the piston 18, the nut 24, and the bearer 33 can be returned by the spring 35 to their positions as shown in the drawing.

The brakes can now be applied as previously by the application of fluid pressure to the chamber 6 through the port 4. As above described, this application of fluid pressure will move the piston 10, the element 25, the tubular element 40 and the output member 64 all to the right (as viewed in the drawing). Although the clutch faces 38 and 39 are now engaged, such movement can still take place for the rightward movement of the element 25 tends to carry with it the nut 24 thus relieving the force exerted by the spring 35 tending to engage the clutch faces 38 and 39. The inter-engagement of the clutch faces 38 and 39 will thus be relieved to allow the nut 24 to spin on the element 25. The brakes now being applied, the fluid pressure in chamber 6 can be released through the port 4 but, unlike the operation which occurred when this fluid pressure was released but the fluid pressure was still present in the chamber 8, the piston 10, the element 25, the tubular element 40 and, therefore the output member 64 cannot return to the left (as viewed in the drawing) for any such tendency of these parts so to move will be prevented by the inter-engagement of the clutch faces 38 and 39 already tended to be engaged by the spring 35 and now further engaged by an even higher force by the normally provided return-spring in the brakes pulling the nut 24 to the left through the tubular element 40 and the element 25. In this condition, the nut 24 cannot rotate to allow such return movement of the output member due to the inter-engagement of the clutch faces 38 and 39.

As so far described, no mention has been made of the operation of the adjustment means 49.

So long as the stroke of the output member 64 does not exceed a predetermined amount, the application of fluid pressure to the first chamber 6 to move the piston 10 to the right (as viewed in the drawing) to apply the brakes will, as above described, also move the tubular element 40 to the right. The tubular element 40 being prevented from rotational movement by frictional engagement of the shoulder 41 with the face 42, such rightward movement of the element 40 will cause the ratchet 51 to ride up the helical tooth 50 with which it is engaged. If, however, there has been no excessive wear of the brake of the vehicle so that, therefore, this rightward movement of the tubular element 40 does not exceed a predetermined amount, such riding-up of the ratchet 51 will be recovered under the influence of the spring 52 during subsequent return movement of the element 40 in the subsequent "brake release" operation.

Should it be that the wear of the brakes has reached an excessive degree then the rightward movement of the tubular element 40 to move the output member 64 will be to a greater extent than the predetermined amount so that the ratchet 51 will ride up over the tooth 50 with which it is engaged to fall (under the influence of the spring 52) into engagement with the next successive tooth 50. Thus, during the return leftward movement in the course of the subsequent release of the brakes, the tubular element 40 will be rotated. This rotational movement of the tubular member 40 will cause that member to be screwed along the output member 64 to the left as viewed in the drawing. Thus it will be seen that the output member 62 will be telescoped into the body 1 a distance corresponding to that leftward screwing of the tubular member 40 on the output member 64. This telescoping of the output member 64 with respect to the body 1 will reduce what has been detected to be an excessive "clearance" of the brakes.

It may be that for shunting operations or for other reasons, the vehicle provided with the above-described actuator may not be fluid-connected with the locomotive moving the vehicle so that it is not possible for fluid to be applied to any of the chambers 6, 7 and 8. During the transit of the vehicle in this condition, it is quite conceivable that the vehicle may suffer "buffering" shocks which would react on the brackes of the vehicle tending to "bounce" the output member 64 to the right. But for the provision of the projection 55 on the tubular member 40 being engaged in one of the recesses 56 in the bearer 33 such "bouncing" of the output member 64 could cause the tubular member 40 to be rotated to effect an undesirable adjustment of the "clearance" of the brakes. This is prevented by the projection 55 being engaged within one of the slots 56 in the bearer 33 thus the tubular member 40 is constrained to axial movement which will not adversely bring about the undesirable adjustment of the "clearance" of the brakes.

As, conventionally, the cross-head 66 will be connected to a pivotally mounted lever of the brake rigging of the brakes of the vehicle, during application and release of the brakes it is necessary that the output member 64 should be free to pivot with the pivotal movement of the lever. Such pivotal movement of the output member 64 is provided by the body 1 being pivotally mounted on the vehicle about the axis 3 on its trunnions 2.

Whilst the actuator above-described has been described in connection with railway vehicle brakes, the use of the actuator is not limited to such an application and can be used for the actuation of any apparatus requiring operation by linear movement of the output member 64.

Having thus described the invention, what we claim is:

1. A fluid-pressure actuator having a hollow body within which is a pressure-responsive member to which is operatively connected an output member movable in opposite directions, one side of the pressure-responsive member forming one wall of a first chamber having communicating therewith a first port through which a first fluid pressure can be applied to the chamber to act on said one side of the pressure-responsive member to move that member in one direction and thereby correspondingly move the output member in one of the opposite directions of movement and the other side of the pressure-responsive member forming one wall of a second chamber having communicating therewith a second port through which a second fluid pressure can be applied to the second chamber to act on said other side of the pressure-responsive member to move that member in the opposite direction and thereby correspondingly move the output member in the other of its opposite directions of movement; an adjustment means operative upon the stroke of the output member exceeding a predetermined amount to telescope the output member relative to the pressure responsive member, the adjustment means including inhibiting means by which the adjustment means is rendered inoperative so as to telescope the two members for so long as the second fluid pressure is present while the first fluid pressure is absent.

2. An actuator as claimed in claim 1, wherein the inhibiting means includes a pair of parts engageable one with the other, one of which parts is non-rotatably mounted in the body and engagement of the parts inhibiting the adjustment means from being operative to effect relative telescoping of the two members.

3. An actuator as claimed in claim 2, wherein one of the parts has therein a series of slots engageable in any one of which is the second part in the form of a projection.

4. An actuator as claimed in claim 1, wherein the adjustment means includes an element threadedly engaged with the output member, relative rotation of the element and the output member effecting the relative telescoping of the output member and the pressure responsive member.

5. An actuator as claimed in claim 4, wherein the output member is non-rotatably located relative to the body, the element being both axially and rotatably moveable in the body.

6. An actuator as claimed in claim 5, wherein the element is tubular and has an internal thread with which the output member is threadedly engaged.

7. An actuator as claimed in claim 6, wherein the element has a shoulder through which movement of the pressure-responsive member in its said one direction is transmitted to the element thereby to move it axially axially to move the output member in said one of its opposite directions of movement.

8. An actuator as claimed in claim 7, wherein the element has another shoulder through which movement of the pressure-responsive member in its said opposite direction is transmitted to the element thereby to move it axially axially to move the output member in said other of its opposite directions so long as the locking means is rendered inoperative.

9. An actuator as claimed in claim 8, wherein the element passes through the pressure-responsive member and the shoulders are positioned one on each side of the pressure-responsive member.

10. An actuator as claimed in claim 9, wherein the element is guided for axial and rotational movement in the body by bearing surfaces one adjacent each end of the element, which surfaces bear against corresponding bores in the body.

11. An actuator as claimed in claim 10, wherein when the output member is non-rotatably located relative to the body and the element is both axially and rotatably moveable in the body, the element is formed with external helical teeth engaged by a ratchet mounted in the body, which ratchet moves from engagement with one tooth into engagement with the next leading tooth if the stroke of the output member exceeds said predetermined amount.

12. An actuator as claimed in claim 11 wherein the helical teeth and the ratchet are situated intermediate the pressure-responsive member and the bearing surface most remote from the pressure-responsive member.

13. An actuator as claimed in claim 1 wherein the actuator has locking means resiliently urged into an operative condition in which the locking means is effective to lock the output member against movement in said other of its opposite directions, which locking means is rendered inoperative by the presence of a second fluid pressure.

14. An actuator as claimed in claim 13, wherein the locking means is located between the pressure-responsive member and the adjustment means.

15. An actuator as claimed in claim 14, wherein the body is substantially tubular and the pressure-responsive means, the locking means and the adjustment means are located serially one after the other along the length of the body.

16. An actuator as claimed in claim 13, wherein the locking means comprises a pair of clutch faces one of which is formed on the body and the other of which on a nut rotatable in the body.

17. An actuator as claimed in claim 16, wherein the nut is threadedly-engaged with a member operatively connected with the output member.

18. An actuator as claimed in claim 17, wherein, when the element has a shoulder through which movement of the pressure-responsive member in its said one direction is transmitted as above claimed, the member threadedly engaged by the nut is clamped between the pressure-responsive member and the shoulder on the element.

19. An actuator as claimed in claim 18, wherein when the clutch faces are formed one on the body and the other on a nut rotatable in the body, the nut is located between a pair of thrust bearings one of which is positioned between the nut and a bearer between which and a shoulder on the body extends a compression spring by which the locking means is resiliently urged into its operative condition.

20. An actuator as claimed in claim 19, wherein the bearer is non-rotatably mounted but axially slidable with respect to the body and has a series of radially-extending slots engagable in which is a projection carried by the element such that when so engaged the element is rendered non-rotatable with respect to the body.

21. An actuator as claimed in claim 20 wherein the element is resiliently urged into a position in which the projection is so engaged.

22. An actuator as claimed in claim 21, wherein the element is so resiliently urged by a spring extending between the element and an interior end face of the body.

23. An actuator as claimed in claim 19, wherein the element is so resiliently urged by a spring extending between the element and the interior end face of the body, and the other of the thrust bearings is positioned between the nut and a second pressure-responsive member non-rotatably mounted in the body and forming one wall of a third chamber in communication with which is the second port, the member threadedly engaged by the nut being non-rotatably mounted but axially slidable with respect to the second pressure-responsive member.

24. An actuator as claimed in claim 23, wherein the pressure-responsive members are both annular pistons the second pressure-responsive member being slidable on the first pressure-responsive member.

* * * * *